BEST AVAILABLE COPY

G. D. HAWORTH.

CORN-PLANTER.

No. 6,818. Reissued Dec. 21, 1875.

Witnesses
Alex. Mahon
John G. Center

Inventor
George D. Haworth
by A. M. Smith, atty.

N. PETERS, PHOTO-LITHOGRAPHER, WASHINGTON, D. C.

BEST AVAILABLE COPY BEST AVAILABLE COPY

UNITED STATES PATENT OFFICE.

GEORGE D. HAWORTH, OF DECATUR, ILLINOIS.

IMPROVEMENT IN CORN-PLANTERS.

Specification forming part of Letters Patent No. 100,032, dated February 22, 1870; reissue No. 6,818, dated December 21, 1875; application filed November 23, 1875.

*To all whom it may concern:*

Be it known that I, GEORGE D. HAWORTH, of Decatur, in the county of Macon and State of Illinois, have invented certain new and useful Improvements in Corn-Planters, of which the following is a full, clear, and exact description, reference being had to the accompanying drawing, making part of this specification, in which—

Figure 1:
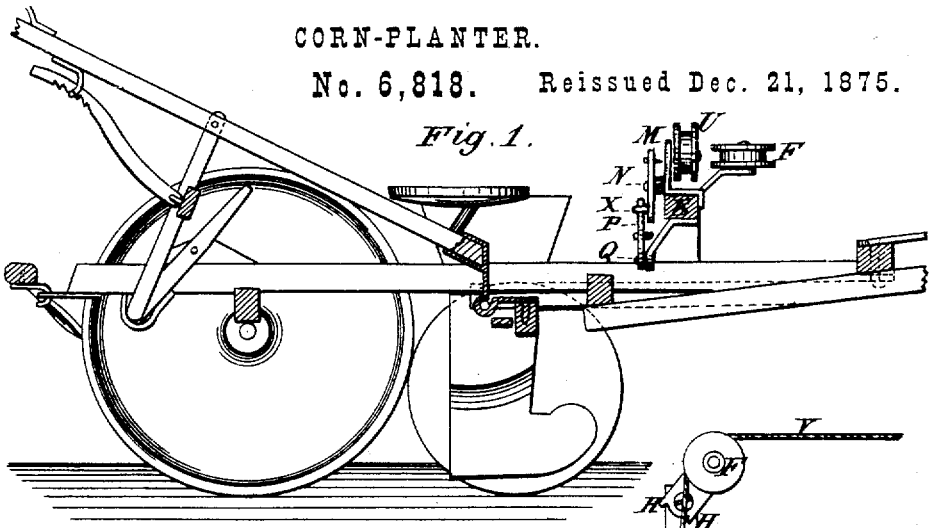
Figure 2:
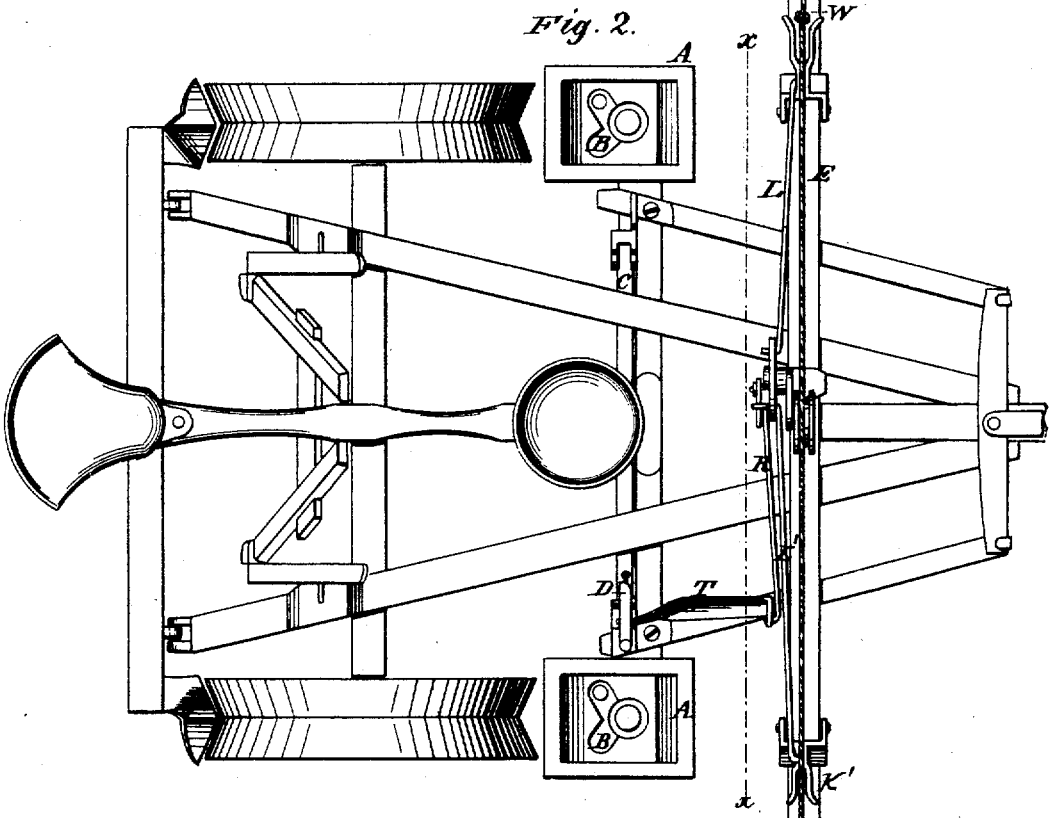
Figure 3:
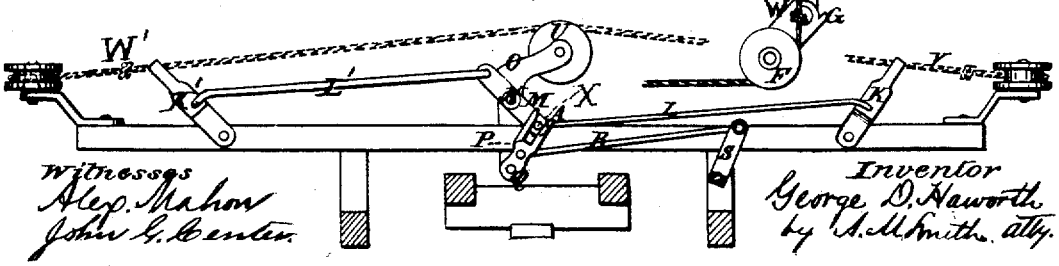

Figure 1 represents a vertical longitudinal section of a corn-planter with my improvements applied. Fig. 2 is a plan view, and Fig. 3 represents a transverse vertical section through the same, taken on line *x x*, Fig. 2.

Similar letters of reference denote corresponding parts wherever used.

The invention relates to that class of corn-planters in which the valves or seed-dropping devices are actuated by a knotted cord stretched across the field, said cord being secured at each end, and working over the machine as the latter is moved back and forth over the field; and has for its object, first, to adapt the knotted cord to impart a positive movement in both directions, or both the discharge and return movements to the seeding devices; second, to an arrangement of the forked arms or levers acted upon by the knotted cord, whereby the action of the cord upon one arm or lever is made to act upon another arm or lever, and to move it into position to be in turn acted upon by the cord; third, to adapt the machine to take up the knotted cord and lay it over upon the other side in proper position for the next passage, in such manner that it shall actuate the seeding devices in its passage from one side of the machine to the other; fourth, to a novel arrangement of the forked arms or levers acted upon by the knotted cord for operating the seeding devices, whereby, while the cord is transferred from one side to the other of the machine, each knot of said cord will be caused to drop the corn into the same row or rows in moving the machine in opposite directions; fifth, to an arrangement whereby the forked arms or levers, on which the cord acts to give motion to the seeding-slides, are adapted to move a certain distance after the knots engage with them before imparting motion to said slides, then to move said slides their full stroke, and release them when the arms are in a position so nearly upright that the knots are not liable to slip off before doing their work, after which the arms are moved onward to such an inclination as will allow the knots to readily pass off; sixth, to a novel construction of the attachment for laying over the cord, and of the means connected therewith for actuating the seeding devices, whereby it is made complete in itself, or substantially so, adapting it to be readily applied to machines now in use; and, lastly, to certain details of construction and arrangement hereinafter fully set forth.

The corn-planter represented in the accompanying drawings, in its organization and general construction and arrangement of parts, is similar to machines in common use, and the hopper A, valves or slides B, slide-operating bar or bars C, and hand-levers D, for operating said slides, may be constructed and applied thereto in any usual or preferred manner, these parts forming, *per se*, no part of the invention, the essential features of which consist in the manner of operating the seed-discharging devices through the medium of a "check-row" cord, and of transferring said cord from one side to the other of the machine. Upon the frame-work of the machine is secured a transverse bar, E, of a length about equal to the distance the machine is moved laterally at the end of each passage across the field preparatory to again moving across the same. This bar has pulleys F arranged upon its ends, said pulleys, in the present instance, being mounted upon supports G, pivoted to the bar E, and made capable of a backward and forward vibration, for preserving the relation of the cord to the bar E and the seed-actuating devices when the direction of movement of the cord across the machine is reversed, as hereinafter explained. The inner or pivoted ends of these supports G are notched or provided with shoulders H, which limit the throw or vibration of the supports by coming in contact with pins or spurs I. K K′ are forked or crotched arms or levers, pivoted to the bar E, one near each end, and connected by rods L L′ with a rocker plate or bar, M, which is pivoted midway of its length in a supporting-bracket or standard, N, the rods L L′ being connected with the bar M, one with one arm and the other with the opposite arm of the bar, and at points equidistant from its pivotal center. The connecting-pin of the rod L passes through a slot in a vibrating plate or lever, P, pivoted at Q to an arm or bracket on the bar E, and connected by a rod, R, with a crank, S, of a rock-shaft, T, which at its opposite end is connected with the hand-lever D of the seed-dropping devices or mechanism, in such manner that by the rocking of the shaft T a vibrating or back and-forth motion is imparted to said lever for actuating the seeding devices. The standard or bracket N has a pulley, U, mounted upon it, for guiding the cord and holding it in proper relation to the arms or levers K K′ actuated thereby. V represents a knotted cord designed to be stretched across the field, and to be fastened at both ends by pins driven into the ground or by other suitable means, and said cord passing around the pulleys F, as shown in Figs. 2 and 3, is carried from one side of the machine to the other, acting in its passage, through knots W therein, upon the arms or levers K K′, imparting motion thereto, and thence to the seeding devices, as explained.

The back-and-forth movements of the arms K K′ are effected as follows: Looking in the direction of the forward movement as the machine advances, the knot on the left is drawn into the fork of the lever or arm K at that side, and which, in the drawing, is represented as inclining toward the knot, causing said knot to engage with the arm and to vibrate it, carrying it over toward the opposite side, until, by the reverse inclination of the arm, the knot is permitted to rise out of, or escape from, the fork in said arm. By this movement the arm K′, through its connection with the arm K, is caused to assume the proper position to receive and be acted upon by the advancing knot on the cord, and said knot acting thereon, and thence again, through the connecting devices, upon the arm K, causes the latter to return to its former position in readiness to be acted upon by the succeeding knot in the cord. Thus a positive movement in both directions is imparted by the cord to the arms K K′, and thence to the seed-dropping devices, as explained, while, at the same time, the action of the cord upon one arm is made to bring the other arm into the proper position to be acted upon by the cord.

In order to produce the movement of the grain-slide in a shorter space of time than is required for the movement of the actuating arms or levers, and which is necessary in order to drop the corn quickly, the slot in the rocking plate P is made wide at the end and tapers down or inward by curved lines, so that the pin X will act on the sides or walls thereof only when the rocking-plate M is near a vertical position, and then only for a short space, the form of the slot adapting the plate M to move both before and after the movement of the plate P for allowing the necessary additional movement of the forked arms or levers K K′, as described. By this arrangement, too, the rocking plate M at the end of its throw in either direction is made to assume such an angle to the walls of the slot of rocking plate P as that it, with the pin X, will hold the latter firmly in position until its movement is reversed by the action of the cord, thereby preventing any rebound of the seeding devices or any sliding back of the same consequent upon the jolting or inclined position of the machine.

The bar E and the devices connected therewith for transferring the cord and for actuating the seeding mechanism, may be detachably connected with the frame and with the hand-lever or other means for operating the seeding devices in such manner that the whole forms an attachment adapted to be applied to any machine, and which may be used or not, as preferred. This bar E is arranged slightly in advance of the seed-hoppers, and the cord in being transferred from the planted side of the machine to the opposite side, to be in readiness for the next or return passage, is carried across the machine directly over said bar, actuating the forked arms or levers K in its passage, and the distance of the bar in advance of the seeding devices being adjusted to and regulated by the distance the machine travels between the action of the knots upon the forked arms K, and the depositing of the seed upon the ground, the same knots in the movement of the machine either way will cause the corn to be dropped in the same row or rows; thus, supposing the machine, as represented in Fig. 2, to be at the end of its movement in one direction across the field, just as the knot at W′ has acted upon and escaped from the forked arm or lever K′. Now, by removing the cord from the machine and resetting its fastening at a distance equal to four rows, reversing the position of the machine for a return passage, and replacing the cord, reversing its relation to the pulleys F F, so that it will now pass in front of the pulley it before passed in rear of, and, vice versa, the knot W′ will occupy the same relation to the arm or lever K′ as that shown in the drawing, and its movement relatively thereto in a reverse direction will give a reverse movement to the arm K′, causing it to actuate the seeding devices, and, by the relative arrangement of the bar E to said devices, to deposit the corn in the same transverse row as in the movement of the machine in the opposite direction, and so on with all the knots of the cord throughout its entire length.

By this arrangement great precision is obtained in the planting of the rows, and each knot is made to plant its own, or always in the same transverse row or rows, as explained, irrespective of the distance apart of the knots.

Other arrangements of devices may be used in connection with the forked arms or levers and the seeding devices for obtaining motion from the cord and imparting it to said seeding devices; and I therefore do not wish to limit myself to the particular arrangement shown and described.

Having now described my invention, what I claim as new, and desire to secure by Letters Patent, is—

1. Forked arms or levers actuating the seeding devices, in combination with the knotted cord or its equivalent, operating said arms or levers, whereby the cord is made to impart a positive movement in both directions to the seeding-slides.

2. The combination, in a seeding-machine, of forked arms or levers and an actuating-cord for operating the seeding devices, whereby the action of the cord upon one arm is made to set or move another arm into position to be acted upon by the cord.

3. In combination with the knotted cord for actuating the seeding devices, guides or pulleys arranged to direct the cord in its passage across the machine on the same line when moving in opposite directions.

4. Guides or pulleys over which the cord passes in being transferred from one side of the machine to the other, in combination with intermediate arms or levers operated upon by the cord in its passage between the guides or pulleys for actuating the seeding devices.

5. The arrangement of the guides or pulleys for transferring the knotted cord from one side of the machine to the other, and of the forked arms or levers acted upon by said cord relatively to the seeding devices, whereby each knot of the cord is made to deposit the seed in the same transverse row or rows when moving in opposite directions, as described.

6. The combination of the forked arms or levers with the seeding-slides and the intermediate connecting devices, adapting said forked arms to move both before and after the movement of the seeding-slides and also to hold said slides while at rest, substantially as described.

7. The combination of the guiding-pulleys for transferring the knotted cord from one side of the machine to the other, and the forked arms or levers and their connecting devices for actuating the seeding mechanism, with the detachable bar E, or its equivalent, adapting them to be readily applied to or removed from the machine, as specified.

8. The combination of the forked arms or levers K K′, rocker-plate M, connecting-rods L L′, forked arms P, rod R, crank S, shaft T, and hand-lever D, substantially as specified.

GEORGE D. HAWORTH.

Witnesses:
MAHLON HAWORTH,
LYSANDER L. HAWORTH.